(12) United States Patent
Kojima

(10) Patent No.: US 8,121,151 B2
(45) Date of Patent: Feb. 21, 2012

(54) RECEPTION APPARATUS AND METHOD AND PROGRAM

(75) Inventor: Toshiaki Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 725 days.

(21) Appl. No.: 11/624,458

(22) Filed: Jan. 18, 2007

(65) Prior Publication Data

US 2007/0171829 A1    Jul. 26, 2007

(30) Foreign Application Priority Data

Jan. 26, 2006   (JP) ................................ 2006-017207

(51) Int. Cl.
  *H04J 3/24* (2006.01)
(52) U.S. Cl. ........................................ 370/473; 370/474
(58) Field of Classification Search .................. 370/465, 370/471–2, 474, 476, 473
  See application file for complete search history.

(56) References Cited

U.S. PATENT DOCUMENTS

| | | | | |
|---|---|---|---|---|
| 5,732,286 A | * | 3/1998 | Leger ............................. | 710/57 |
| 7,450,599 B2 | * | 11/2008 | Walls et al. .................... | 370/412 |
| 2004/0136385 A1 | * | 7/2004 | Xue et al. ....................... | 370/401 |
| 2004/0156366 A1 | * | 8/2004 | Walls et al. .................... | 370/394 |
| 2004/0258407 A1 | * | 12/2004 | Maciocco et al. .............. | 398/45 |

FOREIGN PATENT DOCUMENTS

JP   2003-229905   8/2003

* cited by examiner

*Primary Examiner* — Derrick Ferris
*Assistant Examiner* — Peter Cheng
(74) *Attorney, Agent, or Firm* — Oblon, Spivak, McClelland, Maier & Neustadt, L.L.P.

(57) ABSTRACT

A decider decides whether a predetermined period of time has elapsed after a last one of first packets was received and a timeout thereby occurs. A second packet having a size of data greater than a size of data placed in each of the first packets is produced from a number of the first packets, the number being a first threshold value. Another decider decides, when the predetermined period of time has elapsed, whether a number of times by which the predetermined period of time has successively elapsed exceeds a second threshold value which is a permitted number of times of the timeout. A processing unit sets, when the second threshold value is exceeded by the number of times that the predetermined period of time has successively elapsed, the first threshold value so as to decrement the number of the first packets to be used to produce the second packet.

6 Claims, 12 Drawing Sheets

FIG. 4

| NO | FIELD | DATA PRODUCTION METHOD |
|----|-------|------------------------|
| 1 | VERSION | 4h |
| 2 | HEADER LENGTH | 5 OR F |
| 3 | SERVICE TYPE | COPY FROM IP HEADER |
| 4 | TOTAL LENGTH | 0000h |
| 5 | IDENTIFICATION | COPY FROM IP HEADER |
| 6 | FLAG | 0000h |
| 7 | FRAGMENT OFFSET | 0000h |
| 8 | TIME TO LIVE | COPY FROM IP HEADER |
| 9 | PROTOCOL | TCP=06h |
| 10 | HEADER CHECKSUM | HARDWARE ARITHMETIC OPERATION |
| 11 | TRANSMISSION SOURCE ADDRESS | COPY FROM IP HEADER |
| 12 | DESTINATION ADDRESS | COPY FROM IP HEADER |
| 13 | OPTION, PADDING | NOT PRODUCED |

FIG. 5

| NO | FIELD | DATA PRODUCTION METHOD |
|----|-------|------------------------|
| 1 | TRANSMISSION SOURCE PORT NUMBER | COPY FROM TCP HEADER |
| 2 | DESTINATION PORT NUMBER | COPY FROM TCP HEADER |
| 3 | SEQUENCE NUMBER | HARDWARE ARITHMETIC OPERATION |
| 4 | ACKNOWLEDGEMENT NUMBER | HARDWARE ARITHMETIC OPERATION |
| 5 | DATA OFFSET/HEADER LENGTH | 5 OR F |
| 6 | RESERVED | 0 |
| 7 | CONTROL BIT | OR OF PACKETS |
| 8 | WINDOW | COPY FROM TCP HEADER |
| 9 | CHECKSUM | HARDWARE ARITHMETIC OPERATION |
| 10 | URGENT POINTER | 0 |
| 11 | OPTION, PADDING | NOT PRODUCED |

RECEPTION APPARATUS AND METHOD AND PROGRAM

CROSS REFERENCES TO RELATED APPLICATIONS

The present invention contains subject matter related to Japanese Patent Application JP 2006-017207 filed with the Japanese Patent Office on Jan. 26, 2006, the entire contents of which being incorporated herein by reference.

BACKGROUND OF THE INVENTION

1. Field of the Invention

This invention relates to a reception apparatus and method and a program, and more particularly to a reception apparatus and method and a program wherein a TCE (TCP Offload Engine) is used for communication.

2. Description of the Related Art

In the prior art, the TCP/IP (Transmission Control Protocol/Internet Protocol) is available as one of protocols which are used in a network such as the Internet. The TCP/IP was originally incorporated as software in the UNIX (registered trademark). Also at present, most part of processing of the TCP/IP is imposed on software. However, as the network transfer demand of data of a great volume increases, the demand for higher speed operation of the processing of the TCP/IP has been and is increasing.

In order to satisfy the demand, for example, a technique called TOE (TCP Offload Engine) is available. According to the TOE, processing of the TCP/IP for which a CPU (Central Processing Unit) resource on the host side is used is performed by another chip (hardware for exclusive use). With the TOE, the CPU resource on the host side can be allocated only to the processing of an application program, and consequently, the load on the CPU on the host side can be reduced and the rate of the processing of the TCP/IP can be raised.

An improved transmission apparatus which transmits packets has been proposed formerly by the inventor of the present invention and is disclosed in Japanese Patent Laid-Open No. 2003-229905 (hereinafter referred to as Patent Document 1). In the transmission apparatus, AV (Audio Visual) data inputted are stored once into an AV buffer circuit, and then a jumbo packet of 32 kilobytes is produced from the AV data. The term jumbo packet is used herein as a packet in which data of a size greater than that of a packet of the Ethernet (registered trademark) are placed. Then, the thus produced jumbo packet is disintegrated based on a header produced by a CPU to produce packets of 1,518 bytes in the maximum such that is can be transmitted as the packets.

SUMMARY OF THE INVENTION

However, in the transmission apparatus of Patent Document 1, if the size of the jumbo packet is greater than the size of the buffer, then since a packet of a size greater than that of the buffer cannot be transmitted, the size of a packet to be transmitted at a time can be set smaller than that of the buffer. On the other hand, in a reception apparatus, a timeout process is performed to wait reception of a certain number of packets. Then, when packets of a certain size are received, they are passed to the application layer. However, according to this process, a timeout occurs frequently, resulting in the possibility that the transfer rate may become lower.

For example, where the size of the jumbo packet is greater than the size of the buffer as in a case wherein the size of the jumbo packet is 32 kilobytes and the size of the buffer of the transmission apparatus is 8 kilobytes, a packet of a size of more than 8 kilobytes cannot be transmitted at a time from the transmission apparatus. Therefore, the reception apparatus performs, after it waits for reception of certain packets, a timeout process and then performs a process of passing the packets of the size at the point of time to the application layer. However, in this instance, there is a problem that, since a timeout occurs every time, the transfer rate is lowered.

Therefore, it is demanded to provide a reception apparatus and method and a program by which packets can be reproduced at a higher rate.

According to an embodiment of the present invention, there is provided a reception apparatus for receiving first packets, including a first decider configured to decide whether or not the number of the first packets received in response to a request from an application layer exceeds a first threshold value which is the number of the first packets when a second packet having a size of data greater than the size of data placed in each of the first packets is produced from the first packets, a second decider configured to decide, when it is decided by the first decider that the first threshold value is not exceeded, whether or not a predetermined period of time elapses after the last first packet is received until a timeout occurs, a third decider configured to decide, when it is decided by the second decider that the predetermined period of time elapses, whether or not the number of times by which the predetermined period of time elapses successively exceeds a second threshold value which is a permitted number of times of the timeout, and a first setter configured to set, when it is decided by the third decider that the second threshold value is exceeded, the first threshold value so as to decrement the number of the first packets to be used to produce the second packet.

The reception apparatus may further include a processor configured to produce, when it is decided by the third decider that the second threshold value is not exceeded, the second packet from the received first packets and pass the processing to the application layer.

The reception apparatus may be configured such that, when it is decided by the third decider that the second threshold value is exceeded, the first setter sets the first threshold value so as to decrement the number of the first packets to be used to produce the second packet by one.

The reception apparatus may further include a second setter configured to set initial values for the first threshold value, second threshold value and predetermined time period, the first decider deciding whether or not the number of the first packets received in response to the request from the application layer exceeds the set first threshold value, the second decider deciding, when it is decided by the first decider that the first threshold value is not exceeded, whether or not the set predetermined period of time elapses after the last first packet is received, the third decider deciding, when it is decided by the second decider that the predetermined period of time elapses, whether or not the number of times by which the predetermined period of time elapses successively exceeds the set second threshold value.

According to another embodiment of the present invention, there is provided a reception method for a reception apparatus for receiving first packets, including a first decision step of deciding whether or not the number of the first packets received in response to a request from an application layer exceeds a first threshold value which is the number of the first packets when a second packet having a size of data greater than the size of data placed in each of the first packets is produced from the first packets, a second decision step of deciding, when it is decided that the first threshold value is not exceeded, whether or not a predetermined period of time elapses after the last first packet is received until a timeout occurs, a third decision step of deciding, when it is decided that the predetermined period of time elapses, whether or not the number of times by which the predetermined period of time elapses successively exceeds a second threshold value which is a permitted number of times of the timeout, and a setting step of setting, when it is decided that the second threshold value is exceeded, the first threshold value so as to decrement the number of the first packets to be used to produce the second packet.

According to a further embodiment of the present invention, there is provided a program for causing a computer to perform processing of a reception apparatus for receiving first packets, including a first decision step of deciding whether or not the number of the first packets received in response to a request from an application layer exceeds a first threshold value which is the number of the first packets when a second packet having a size of data greater than the size of data placed in each of the first packets is produced from the first packets, a second decision step of deciding, when it is decided that the first threshold value is not exceeded, whether or not a predetermined period of time elapses after the last first packet is received until a timeout occurs, a third decision step of deciding, when it is decided that the predetermined period of time elapses, whether or not the number of times by which the predetermined period of time elapses successively exceeds a second threshold value which is a permitted number of times of the timeout, and a setting step of setting, when it is decided that the second threshold value is exceeded, the first threshold value so as to decrement the number of the first packets to be used to produce the second packet.

In the reception apparatus and method and the program, it is decided first whether or not the number of the first packets received in response to a request from the application layer exceeds the first threshold value which is the number of the first packets when the second packet having a size of data greater than the size of data placed in each of the first packets is produced from the first packets. Then, when it is decided that the first threshold value is not exceeded, it is decided whether or not the predetermined period of time elapses after the last first packet is received until a timeout occurs. Thereafter, when it is decided that the predetermined period of time elapses, it is decided whether or not the number of times by which the predetermined period of time elapses successively exceeds the second threshold value which is a permitted number of times of the timeout. Then, when it is decided that the second threshold value is exceeded, the first threshold value is set so as to decrement the number of the first packets to be used to produce the second packet.

With the reception apparatus and method and the program, packets can be received at a higher rate.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is a table illustrating a process of producing an IP header;

FIG. 5 is a table illustrating a process of producing a TCP header;

DETAILED DESCRIPTION OF THE PREFERRED EMBODIMENT

Figure 1:
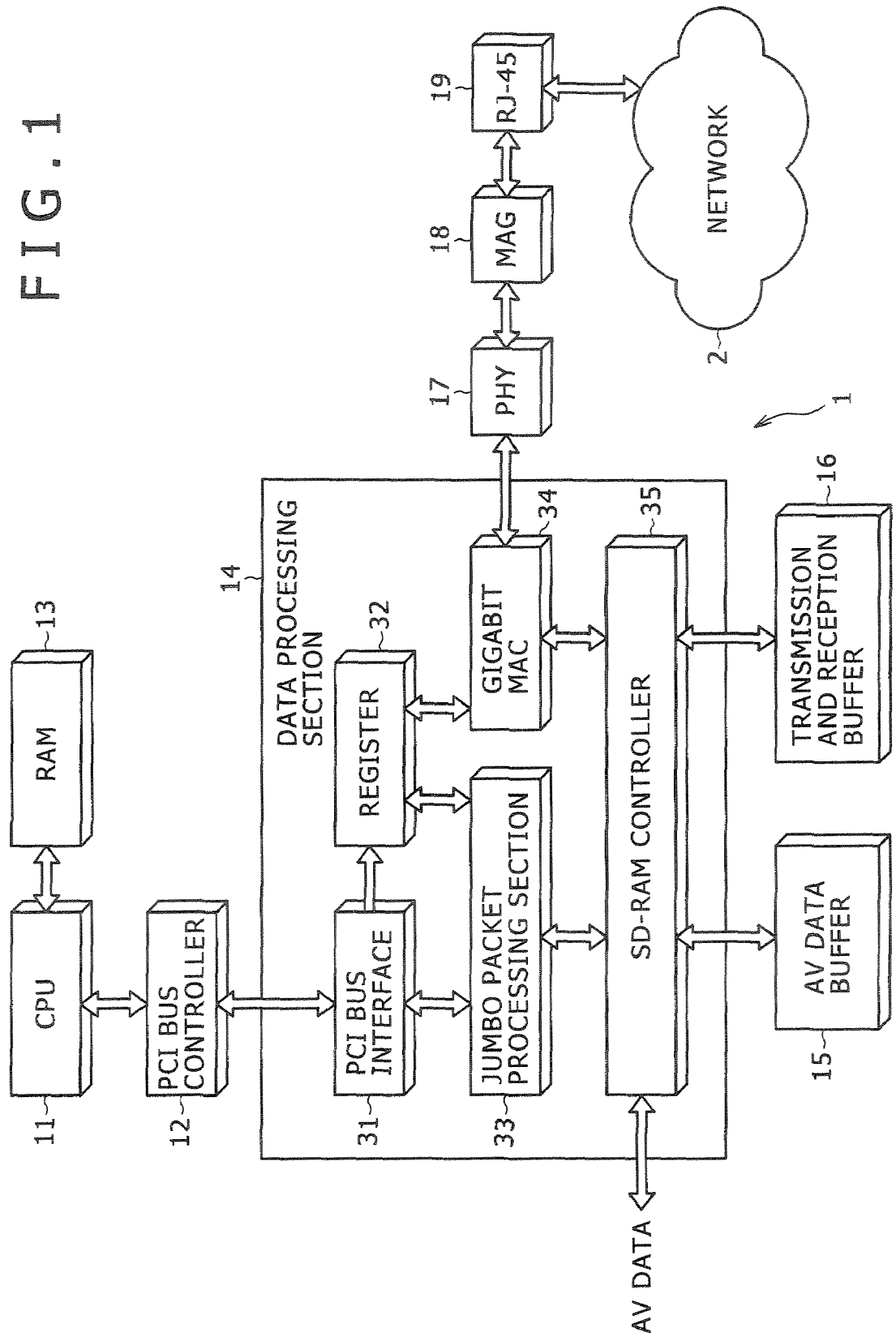
FIG. 1 is a block diagram showing an example of a hardware configuration of a personal computer to which the present invention is applied.

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

According to an embodiment of the present invention, there is provided a reception apparatus (for example, a personal computer 1 of FIG. 7) for receiving first packets (for example, packets), including a first decider (for example, a setup packet number decision section 121 of FIG. 7) configured to decide whether or not the number of the first packets received in response to a request from an application layer exceeds a first threshold value (for example, a setup packet number) which is the number of the first packets when a second packet (for example, a jumbo packet) having a size of data greater than the size of data placed in each of the first packets is produced from the first packets, a second decider (for example, a timeout time decision section 122 of FIG. 7) configured to decide, when it is decided by the first decider that the first threshold value is not exceeded, whether or not a predetermined period of time (for example, timeout time) elapses after the last first packet is received until a timeout occurs, a third decider (for example, a timeout time number decision section 123 of FIG. 7) configured to decide, when it is decided by the second decider that the predetermined period of time elapses, whether or not the number of times by which the predetermined period of time elapses successively exceeds a second threshold value (for example, a timeout time number) which is a permitted number of times of the timeout, and a first setter (for example, a makeup packet number setting section 124 of FIG. 7) configured to set, when it is decided by the third decider that the second threshold value is exceeded, the first threshold value so as to decrement the number of the first packets to be used to produce the second packet.

The reception apparatus may further include a processor (for example, a packet processing section 125 of FIG. 7) configured to produce, when it is decided by the third decider that the second threshold value is not exceeded, the second packet from the received first packets and pass the processing to the application layer.

The reception apparatus may be configured such that, when it is decided by the third decider that the second threshold value is exceeded, the first setter sets the first threshold value so as to decrement the number of the first packets to be used to produce the second packet by one.

The reception apparatus may further include a second setter (for example, an initial value setting section 111 of FIG. 7) configured to set initial values for the first threshold value, second threshold value and predetermined time period, the first decider deciding whether or not the number of the first packets received in response to the request from the application layer exceeds the set first threshold value, the second decider deciding, when it is decided by the first decider that the first threshold value is not exceeded, whether or not the set predetermined period of time elapses after the last first packet is received, the third decider deciding, when it is decided by the second decider that the predetermined period of time elapses, whether or not the number of times by which the predetermined period of time elapses successively exceeds the set second threshold value.

According to another embodiment of the present invention, there is provided a reception method for a reception apparatus for receiving first packets or a program for causing a computer to perform processing of a reception apparatus for receiving first packets, including a first decision step (for example, a process at step S133 of FIG. 12) of deciding whether or not the number of the first packets (for example, packets) received in response to a request from an application layer exceeds a first threshold value (for example, a setup packet number) which is the number of the first packets when a second packet (for example, a jumbo packet) having a size of data greater than the size of data placed in each of the first packets is produced from the first packets, a second decision step (for example, a process at step S137 of FIG. 12) of deciding, when it is decided that the first threshold value is not exceeded, whether or not a predetermined period of time (for example, timeout time) elapses after the last first packet is received until a timeout occurs, a third decision step (for example, a process at step S138 of FIG. 12) of deciding, when it is decided that the predetermined period of time elapses, whether or not the number of times by which the predetermined period of time elapses successively exceeds a second threshold value (for example, a timeout time number) which is a permitted number of times of the timeout, and a setting step (for example, a process at step S140 of FIG. 12) of setting, when it is decided that the second threshold value is exceeded, the first threshold value so as to decrement the number of the first packets to be used to produce the second packet.

Figure 13:
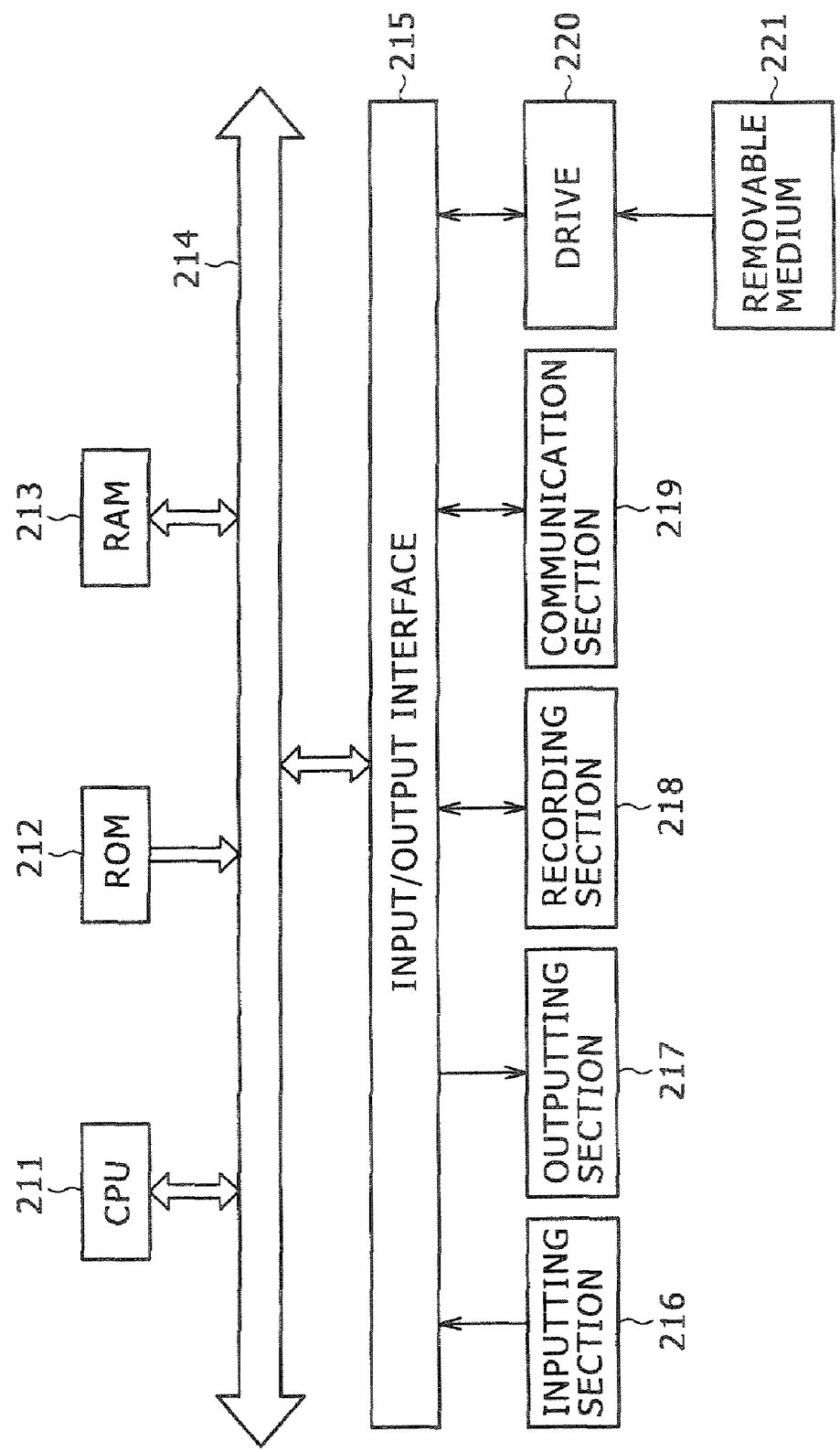
FIG. 13 is a block diagram showing a configuration of a general personal computer.

The program may be recorded on a recording medium (for example, a removable medium 221 of FIG. 13).

In the following, a preferred embodiment of the present invention is described with reference to the accompanying drawings.

FIG. 1 shows an example of a hardware configuration of a personal computer 1 to which the present invention is applied.

Referring to FIG. 1, the personal computer 1 is connected to a network 2. The personal computer 1 receives various data such as AV data transmitted thereto from another apparatus connected to the network 2 in accordance with a protocol such as, for example, the TCP/IP. Thus, the personal computer 1 is an example of a reception apparatus to which the present the present invention is applied. It is to be noted that the personal computer 1 may be configured not only so as to receive data but also so as to transmit data. Therefore, the personal computer 1 is described below in connection with both of transmission and reception of data.

The personal computer 1 includes a CPU 11, a peripheral computer interconnect (PCI) bus controller 12, a random access memory (RAM) 13, a data processing section 14, an AV data buffer 15, a transmission and reception buffer 16, a physical layer circuit (PHY) 17, a pulse transformer (MAG) 18, and a connector (RJ-45)19.

The CPU 11 controls the components of the personal computer 1. Further, the CPU 11 executes application programs (software programs) recorded in a read only memory (ROM) 212 or a recording section 218 hereinafter described. The CPU 11 further performs a TCP/IP process relating to transmission/reception of packets based on a predetermined communication program (software program). For example, when the personal computer 1 performs transmission or reception of a packet, the CPU 11 does not perform processing of AV data itself included in the packet but performs a process relating to a header (control data) included in the packet.

More particularly, the CPU 11 performs an IP process for transmitting a packet to a different apparatus connected to the network 2 and an ICMP (Internet Control Message Protocol) process for notifying the different apparatus of an error state when the error state occurs during transmission of a packet. The CPU 11 further performs an ARP (Address Resolution Protocol) process for performing conversion between an IP address and an MAC (Media Access Control) address, a TCP process of the connection type for identifying a program by which the communication is performed and allocating a port to the program, and other necessary processes. The processes mentioned are performed through the network 2 in accordance with software programs recorded in the ROM 212 or the recording section 218 hereinafter described or the like.

In other words, the CPU 11 does not process, for example, AV data stored in the AV data buffer 15 or data themselves of packets or the like stored in the transmission and reception buffer 16 but performs processing based on information stored in the RAM 13 such as, for example, information of the top address and the length of data such as AV data or data of packets. In particular, the CPU 11 performs processing of a header. This signifies that, at this time, data themselves such as AV data are not stored in the RAM 13.

Further, the CPU 11 controls the data processing section 14 through the PCI bus controller 12. The data processing section 14 is a hardware component which performs integrating and disintegrating processes of data (packets) to be transmitted and received by the personal computer 1. The data processing section 14 further performs processes from among transmission and reception processes of data by the personal computer 1 other than those processes mentioned hereinabove such as the IP process executed by the CPU 11.

The data processing section 14 includes a PCI bus interface 31, a register 32, a jumbo packet processing section 33, a gigabit MAC 34 and a synchronous dynamic-random access memory (SD-RAM) controller 35.

The PCI bus interface 31 serves as an interface for data to be transferred between the register 32 and jumbo packet processing section 33 and the PCI bus controller 12. The register 32 stores data inputted or to be outputted through the PCI bus interface 31, data to be processed by the jumbo packet processing section 33 and the gigabit MAC 34, and resultant data of the process.

The SD-RAM controller 35 controls data transfer between the AV data buffer 15 or transmission and reception buffer 16 and the jumbo packet processing section 33 or gigabit MAC 34. Upon transmission of data, the SD-RAM controller 35 stores AV data supplied thereto, for example, from an image sound processing apparatus (not shown), which performs various processes for AV data, into the AV data buffer 15.

Upon transmission of data, the jumbo packet processing section 33 reads out AV data stored in the AV data buffer 15 and performs various processes for the read out AV data to produce a jumbo packet of a size of, for example, 32 kilobytes in which the AV data are placed. Further, the jumbo packet processing section 33 produces a header to be used for transmission of the packet based on a header supplied thereto from the CPU 11 through the PCI bus interface 31 from the PCI bus controller 12. Then, the jumbo packet processing section 33 divides the AV data included in the jumbo packet to produce packets each of which includes the AV data obtained by the division and a header to be used for transmission of the packet. The jumbo packet processing section 33 stores the thus produced packets into the transmission and reception buffer 16 under the control of the SD-RAM controller 35.

The gigabit MAC 34 performs a MAC process of data to be inputted to and outputted from the physical layer circuit 17. Upon transmission of data, the gigabit MAC 34 performs the MAC process for packets stored in the transmission and reception buffer 16 and supplies the resulting packets to the physical layer circuit 17 under the control of the SD-RAM controller 35.

The physical layer circuit 17 performs processes of the physical layer such as modulation or demodulation of a packet to be transferred and received by the personal computer 1 through the network 2 in accordance with, for example, the Ethernet standards. Upon transmission of data, the physical layer circuit 17 performs processes of the physical layer such as, for example, modulation for the packets supplied thereto from the gigabit MAC 34 and supplies resulting packets to the connector 19 through the pulse transformer 18.

The connector 19 is, for example, of the RJ-45 type and is connected to the network 2 through a communication line. Upon data transmission, the connector 19 transmits a packet supplied thereto from the physical layer circuit 17 through the pulse transformer 18 to another apparatus connected to the network 2 through the network 2.

On the other hand, upon reception of data, the connector 19 receives a packet transmitted thereto from a different apparatus connected to the network 2 through the network 2 and supplies the received packet to the physical layer circuit 17 through the pulse transformer 18. The physical layer circuit 17 performs processes of the physical layer such as, for example, demodulation for the packet supplied thereto from the connector 19 through the pulse transformer 18 and supplies resulting data to the gigabit MAC 34.

Upon reception of data, the gigabit MAC 34 performs a MAC process for a packet supplied thereto from the physical layer circuit 17 and supplies a resulting packet to the SD-RAM controller 35. The SD-RAM controller 35 stores the packet supplied thereto from the gigabit MAC 34 into the transmission and reception buffer 16.

Upon reception of data, the jumbo packet processing section 33 integrates a plurality of packets read out from the transmission and reception buffer 16 by the SD-RAM controller 35 and supplied thereto from the SD-RAM controller 35 to produce a jumbo packet. The jumbo packet processing section 33 disintegrates the jumbo packet based on a result of a TCP/IP process supplied from the CPU 11 through the PCI bus controller 12 and the PCI bus interface 31 to produce packets.

Then, the jumbo packet processing section 33 supplies the produced packets to the AV data buffer 15 so as to be stored into the AV data buffer 15 under the control of the SD-RAM controller 35. The SD-RAM controller 35 outputs the packets stored in the AV data buffer 15 to the image sound processing apparatus not shown which performs various processes for AV data.

Now, a process for transmission and reception of a packet by the personal computer 1 of FIG. 1 is described with reference to flow charts of FIGS. 2 and 6.

First, a process by the personal computer 1 of transmitting a packet to a different apparatus connected to the network 2 through the network 2 is described with reference to the flow chart of FIG. 2.

At step S11, the AV data buffer 15 stores AV data outputted from the image sound processing apparatus not shown, which performs various processes for AV data, under the control of the SD-RAM controller 35.

At step S21, the jumbo packet processing section 33 reads out the AV data stored in the AV data buffer 15 and produces a jumbo packet in which the read out AV data are placed under the control of the SD-RAM controller 35. For example, the jumbo packet processing section 33 produces a jumbo packet of a size of 32 kilobytes in which AV data are placed as seen on the upper side in FIG. 3.

Referring back to FIG. 2, at step S22, the jumbo packet processing section 33 supplies data necessary for a transmission process of the produced jumbo packet to the CPU 11 from the PCI bus interface 31 through the PCI bus controller 12. Further, at this time, the jumbo packet processing section 33 supplies also data stored in the register 32 from the PCI bus interface 31 to the CPU 11 through the PCI bus controller 12 as occasion demands.

At step S41, the CPU 11 performs a TCP/IP process for transmitting the jumbo packet based on data supplied from the jumbo packet processing section 33 through the PCI bus interface 31 and the PCI bus controller 12 to produce a header HD1 which includes an IP header and a TCP header. The CPU 11 supplies the header HD1 to the jumbo packet processing section 33 from the PCI bus controller 12 through the PCI bus interface 31.

Figure 3:
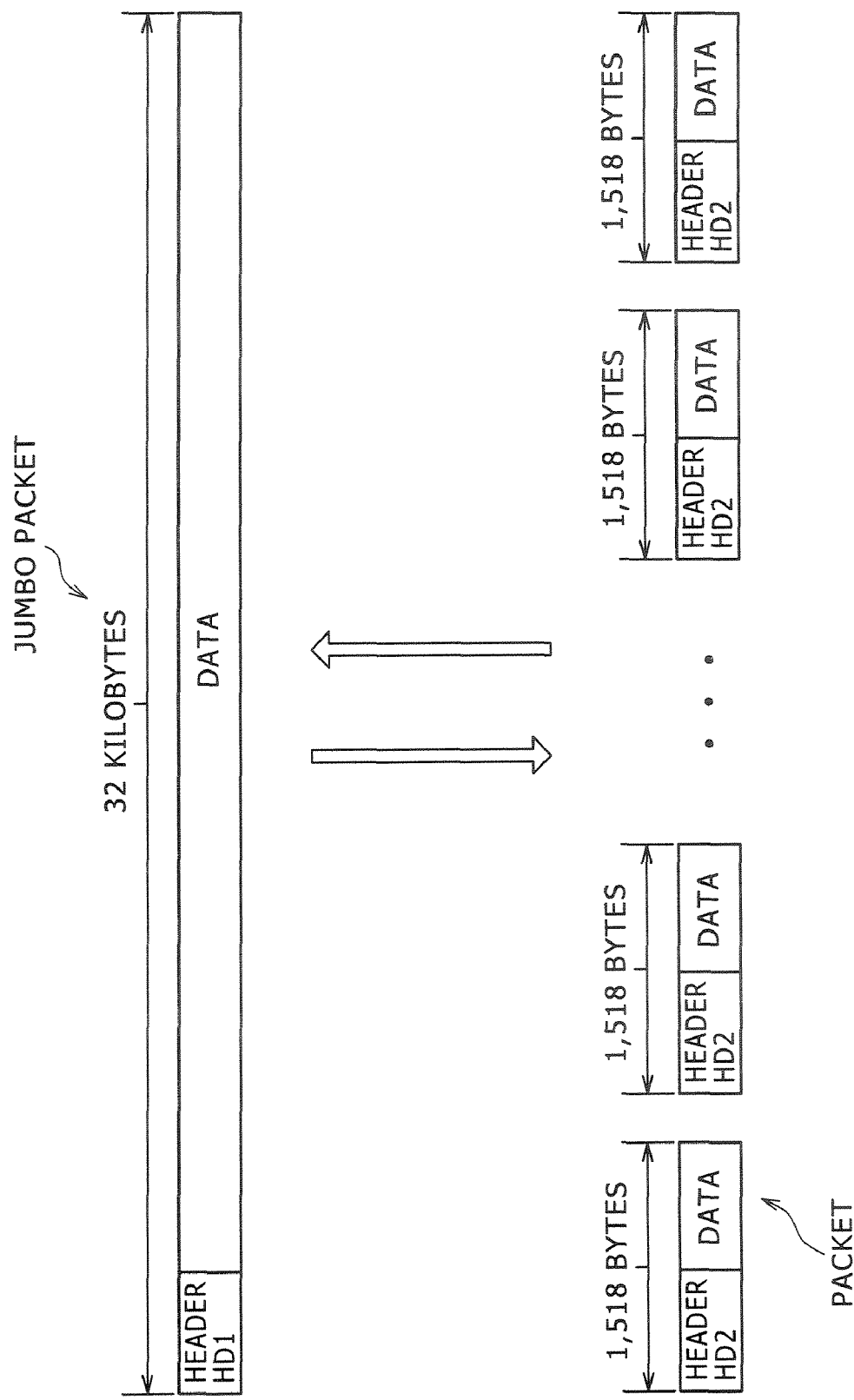
FIG. 3 is a diagrammatic view illustrating a relationship between a jumbo packet and packets.

At this time, the jumbo packet processing section 33 stores the jumbo packet of the size of 32 kilobytes, in which the header HD1 including the IP header and the TCP header is added to the data (AV data), which is shown on the upper side in FIG. 3, into the transmission and reception buffer 16 under the control of the SD-RAM controller 35.

Referring back to FIG. 2, at step S23, the jumbo packet processing section 33 produces a header HD2 to be used for transmission of a packet based on the header HD1 supplied thereto from the CPU 11. Then, the jumbo packet processing section 33 disintegrates AV data included in the jumbo packet stored in the transmission and reception buffer 16 to produce packets which include the AV data obtained by the disintegration and the header HD2 under the control of the SD-RAM controller 35.

In particular, the jumbo packet processing section 33 produces such an IP header of the header HD2 as indicated as IP header of the header HD2 of FIG. 4. The IP header includes several fields for a service type (Service Type), identification (Identification), time to live (Time to Live), a transmission source address (Source IP Address) and a designation address (Destination IP address), which are produced using (copying) a service type, identification, time to live, transmission source address and destination address of the IP header of the header HD1 as they are.

The IP header of the header HD2 further includes fields for a version (Version), in which "4h" is placed, a header length (HLEN), in which "5" or "F" is placed, a total length (Total Length), in which "0000h" is placed, and a flag (Flags), in which "0000h" is placed. The IP header further includes fields for a fragment offset (Fragment Offset), in which "000h" is placed, a protocol (Protocol), in which "TCP=06h" is placed, and a header checksum (Header Checksum), in which a value arithmetically operated by hardware is placed. The IP header further includes a field for an option (IP Options) and padding (Padding), for which no data is produced.

Further, the jumbo packet processing section 33 produces such a TCP header of the header HD2 as indicated as TCP header of the header HD2 of FIG. 5. The IP header includes fields for a transmission source port number (Source Port), a destination port number (Destination Port), and a window (Window), which are produced using (copying) transmission source port number data, destination port number data and window data of the TCP header of the header HD1 as they are.

The TCP header of the header HD2 further includes, for example, as seen in FIG. 5, fields for a sequence number (Sequence Number) and an acknowledgement number (Acknowledgement Number), in each of which a value arithmetically operated by hardware is placed. The TCP header further includes fields for a data offset/header length (HLEN), in which "5" or "F" is placed, a reservation (Reserved), in which "0" is placed, and a control bit (Code Bit), in which an ORed value of the packets is placed. The TCP header further includes fields for a checksum (Checksum), in which a value arithmetically operated by hardware is placed, an urgent pointer (Urgent Pointer), in which "0" is placed, and an option (IP Options) and padding (Padding), for which no data is produced.

In other words, the jumbo packet processing section 33 disintegrates the AV data included in the jumbo packet to produce a plurality of packets of a maximum packet length of 1,518 bytes including AV data (denoted as data in FIG. 3) obtained by the disintegration and the header HD2 produced based on the header HD1 as seen on the lower side in FIG. 3.

Figure 2:
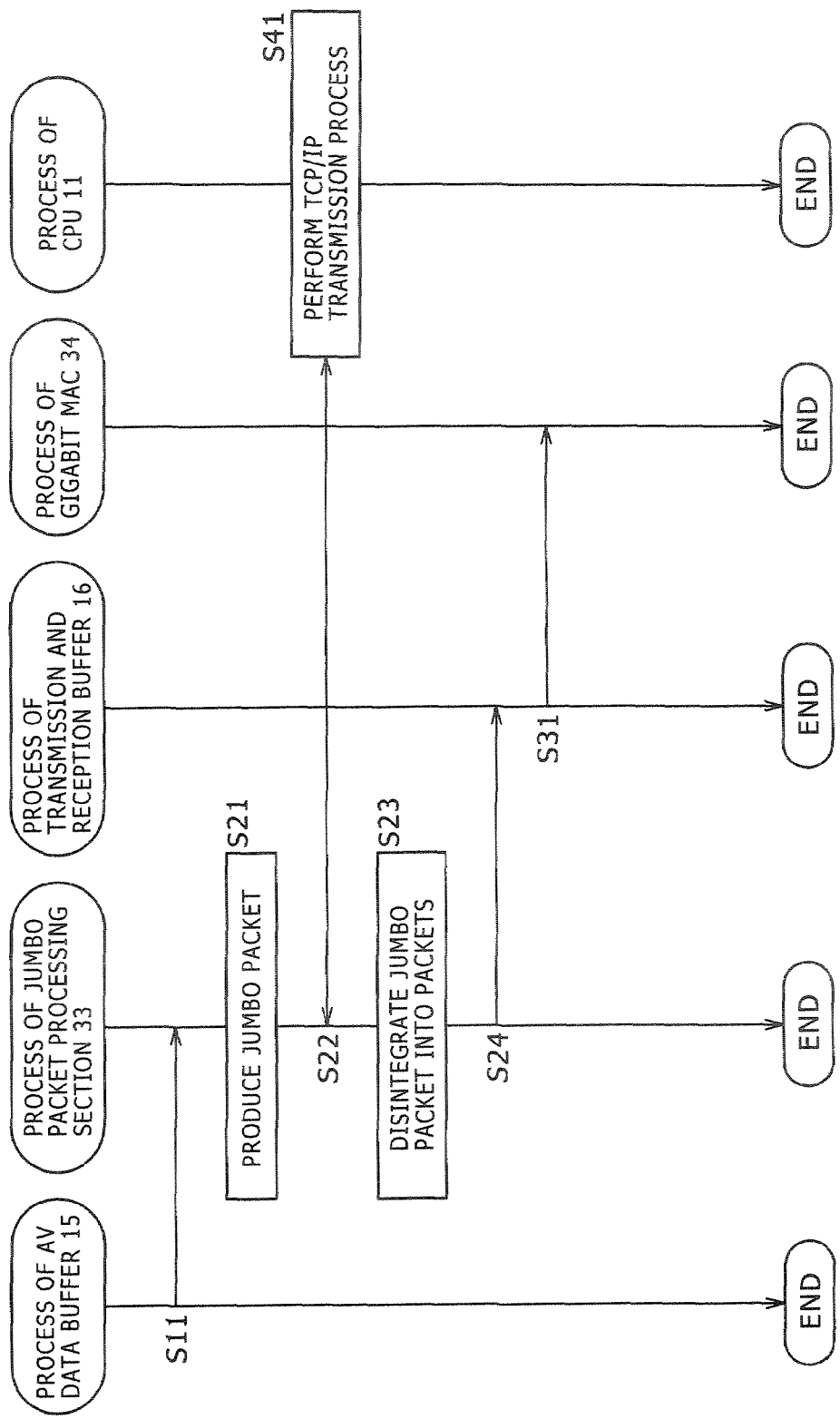
FIG. 2 is a flow diagram illustrating processing of packet communication by the personal computer of FIG. 1.

Referring back to the flow chart of FIG. 2, at step S24, the jumbo packet processing section 33 stores the produced packets into the transmission and reception buffer 16 under the control of the SD-RAM controller 35.

At step S31, the transmission and reception buffer 16 supplies the packets stored therein to the gigabit MAC 34 under the control of the SD-RAM controller 35. The packets supplied to the gigabit MAC 34 are subject to a MAC process by the gigabit MAC 34 and processes of the physical layer by the physical layer circuit 17 and are then transmitted from the connector 19 to the network 2 through the pulse transformer 18.

In this manner, the personal computer 1 transmits packets to a different apparatus connected to the network 2 through the network 2.

Now, a packet reception process by the personal computer 1 through the network 2 from a different apparatus connected to the network 2 is described with reference to a flow chart of FIG. 6.

When the personal computer 1 receives a packet through the network 2, the packet is received by the connector 19 and is subject to processes of the physical layer by the physical layer circuit 17 through the pulse transformer 18, and is then supplied to the gigabit MAC 34.

At step S71, the gigabit MAC 34 performs a MAC process for the packet received from the network 2 and supplied from the physical layer circuit 17 and supplies a resulting packet to the SD-RAM controller 35. The SD-RAM controller 35 stores the packet supplied from the gigabit MAC 34 into the transmission and reception buffer 16.

At step S61, the transmission and reception buffer 16 supplies packets stored therein to the jumbo packet processing section 33 under the control of the SD-RAM controller 35.

At step S51, the jumbo packet processing section 33 integrates a plurality of ones of the packets read out from the transmission and reception buffer 16 by the SD-RAM controller 35 and supplied from the SD-RAM controller 35 to produce a jumbo packet. For example, the jumbo packet processing section 33 integrates a plurality of packets supplied from the SD-RAM controller 35 in accordance with processes of the IP header (FIG. 4) and the TCP header (FIG. 5) of the header HD2 added to the packets to produce a jumbo packet of a size of 32 kilobytes to which the header HD1 composed of the IP header and the TCP header is added as seen on the upper side in FIG. 3.

In particular, the jumbo packet processing section 33 uses (copies), for example, the service type, identification, time to live, transmission source address and destination address as in the IP header of the header HD2 shown in FIG. 4 as they are to produce the IP header of the header HD1. Further, the jumbo packet processing section 33 uses (copies) the transmission source port number, destination port number and window as in the TCP header of the header HD2 shown in FIG. 5 as they are to produce the TCP header of the header HD1.

It is to be noted that, at this time, the jumbo packet processing section 33 produces the checksum data of the IP header of the header HD1 and the checksum data, sequence number and acknowledge number of the TCP header. Further, the jumbo packet processing section 33 performs checksum arithmetic operation using the checksum data of the IP header and the TCP header of the header HD2 and the AV data included in the packet.

Then, the jumbo packet processing section 33 supplies data necessary for a reception process of the jumbo packet from the PCI bus interface 31 to the CPU 11 through the PCI bus controller 12. The data necessary for the transmission process may include, for example, the transmission source address, destination address, size data and so forth acquired from the header HD2 (for example, the IP header of FIG. 4 and the TCP header of FIG. 5) of the packets. Further, at this time, the jumbo packet processing section 33 supplies also data stored in the register 32 from the PCI bus interface 31 to the CPU 11 through the PCI bus controller 12.

Referring back to FIG. 6, at step S81, the CPU 11 performs a TCP/IP process for receiving the jumbo packet based on the data supplied from the jumbo packet processing section 33 through the PCI bus interface 31 and the PCI bus controller 12. The CPU 11 supplies a result of the TCP/IP process from the PCI bus controller 12 to the jumbo packet processing section 33 through the PCI bus interface 31.

At step S52, the jumbo packet processing section 33 disintegrates the jumbo packet based on the result of the TCP/IP process supplied thereto from the CPU 11 and received from the PCI bus controller 12 through the PCI bus interface 31 to produce packets. For example, the jumbo packet processing section 33 disintegrates AV data included in the jumbo packet to produce a plurality of packets of a maximum packet length of 1,518 bytes including the AV data obtained by the disintegration (represented as data in FIG. 3) and the header HD2 as seen on the lower side in FIG. 3.

Figure 6:
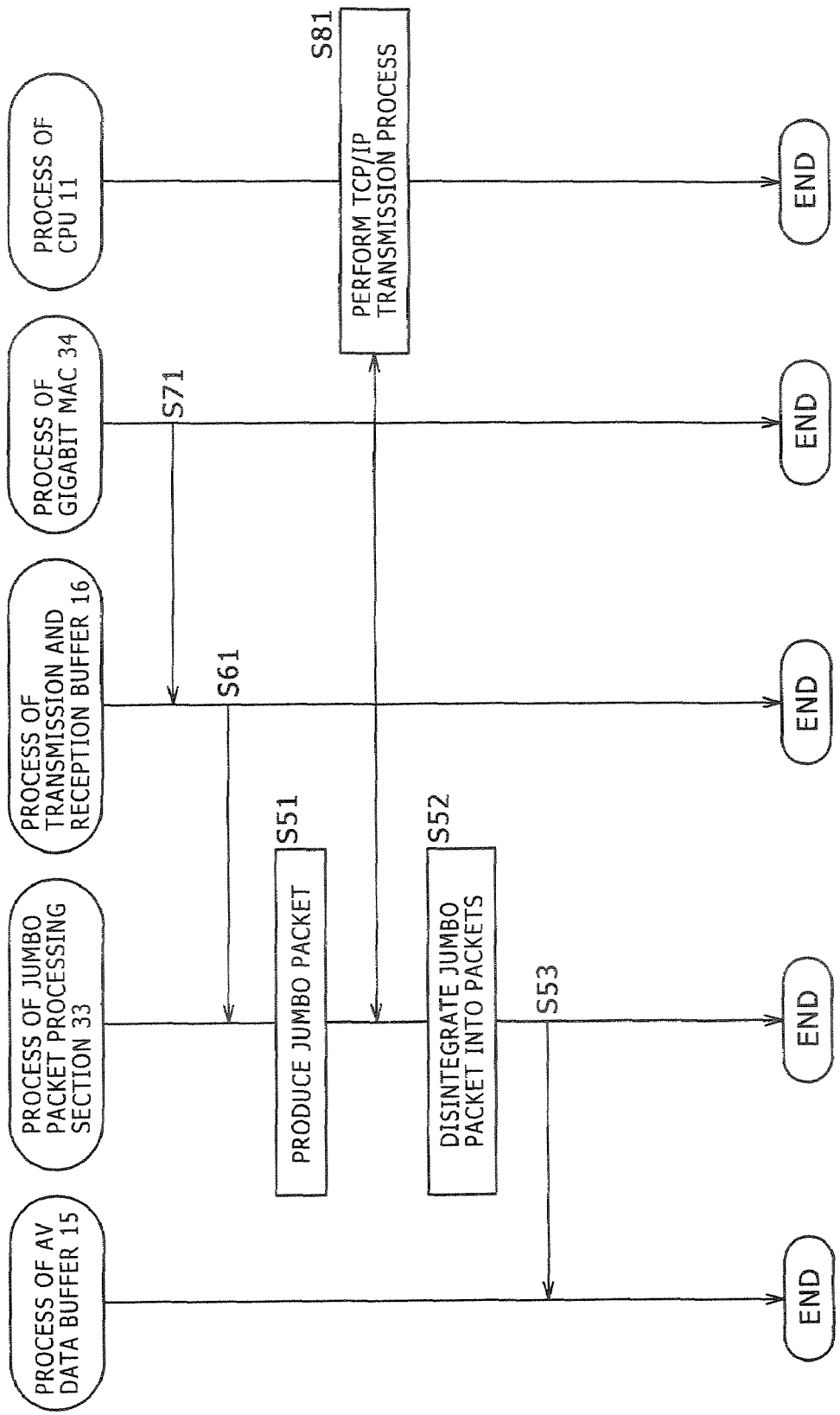
FIG. 6 is a flow diagram illustrating processing of packet reception by the personal computer of FIG. 1.

Referring back to the flow chart of FIG. 6, at step S53, the jumbo packet processing section 33 supplies the produced packets to the AV data buffer 15 so as to be stored under the control of the SD-RAM controller 35. Then, the packets stored in the AV data buffer 15 are outputted to the image sound processing apparatus not shown, which performs various processes for the AV data, under the control of the SD-RAM controller 35.

The personal computer 1 receives a packet from a different apparatus connected to the network 2 through the network 2 in such a manner as described above.

In this manner, in the personal computer 1, the data processing section 14 produces a jumbo packet composed of a plurality of packets and causes the CPU 11 to perform a transmission and reception process (TCP/IP process) of the jumbo packet. Therefore, when compared with an alternative configuration wherein a transmission and reception process of a plurality of packets is performed by the CPU 11, the processing burden on the CPU 11 can be reduced.

Further, at this time, only data of a small data amount such as, for example, a header or register data is transmitted between the CPU 11 and the data processing section 14, and the data processing section 14 performs part of a TCP/IP process at a high rate by hardware of the data processing section 14. Consequently, a conventional PCI bus can be used as it is, and the speed of the TCP/IP process can be increased without raising the speed of operation of the CPU 11. As a result, the personal computer 1 can be simplified in configuration and produced at a reduced cost.

Incidentally, as described hereinabove, in the proposal described hereinabove, where the size of the jumbo packet is greater than the size of the buffer as in a case wherein, for example, the size of the jumbo packet is 32 kilobytes and the size of the buffer of the transmission apparatus is 8 kilobytes, a packet of a size of more than 8 kilobytes cannot be transmitted at a time from the transmission apparatus. Therefore, the reception apparatus performs, after it waits reception of certain packets, a timeout process and then performs a process of passing packets of the size at the point of time to the application layer.

In this instance, there is the possibility that the timeout may occur frequently, resulting in decrease of the transfer rate. The inventor of the present invention has invented a technique which solves not only the subject of the prior art described hereinabove but also the new subject just described simultaneously. According to the technique, when a timeout successively occurs several times, the number of packets upon production of a jumbo packet from packets is changed dynamically to vary the size of the jumbo packet to be produced. In the following, a process of receiving packets while the number of packets upon production of a jumbo packet is dynamically varied is described with reference to FIGS. 7 to 12. It is to be noted that the process described below with reference to FIGS. 7 to 12 is carried out, for example, when a jumbo packet is produced by the process at step S51 of FIG. 6.

Figure 7:
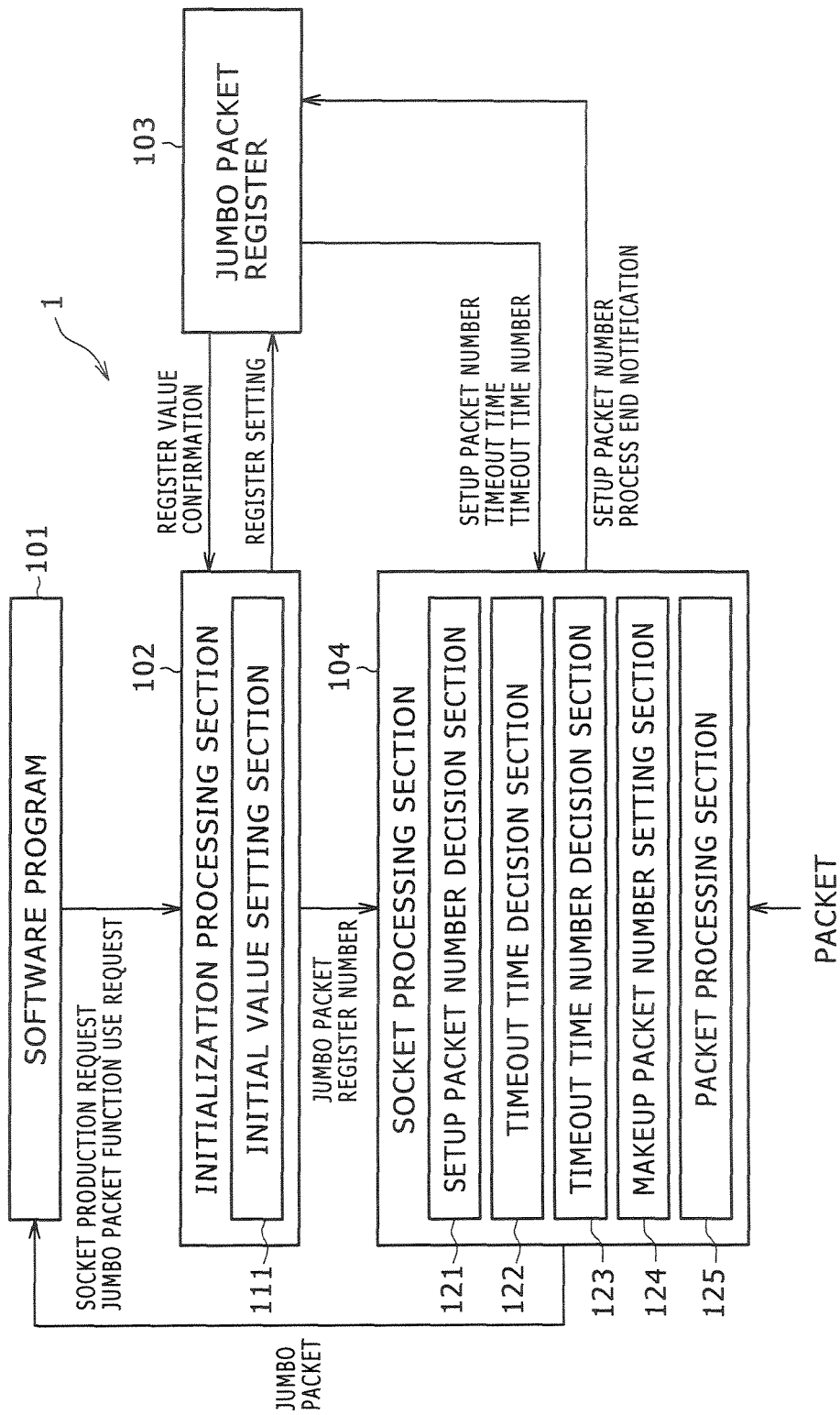
FIG. 7 is a block diagram showing an example of a functional configuration of the personal computer of FIG. 1.
Figure 8:
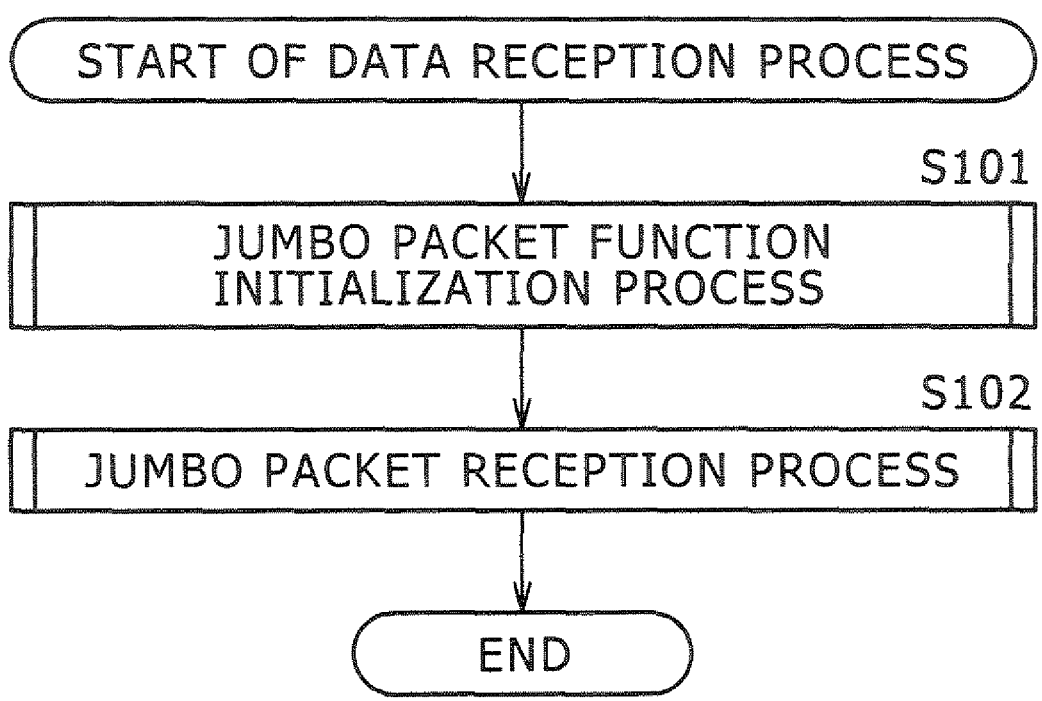
FIG. 8 is a flow chart illustrating a data reception process by the personal computer of FIG. 1.

FIG. 7 shows an example of a functional configuration of the personal computer 1 of FIG. 1.

Referring to FIG. 7, the personal computer 1 includes a software program 101, initialization processing section 102, a jumbo packet register 103, and a socket processing section 104.

It is to be noted that, in the present embodiment, since the personal computer 1 has the hardware configuration described hereinabove with reference to FIG. 1, the software program 101 is configured as a program (software) to be executed by the CPU 11 (FIG. 1). Further, the initialization processing section 102 and the socket processing section 104 are configures as programs executed, for example, by the jumbo packet processing section 33 (FIG. 1). However, if the configuration of the personal computer 1 is varied from the hardware configuration of FIG. 1, it is possible to form the software program 101, initialization processing section 102 or socket processing section 104 as a sole piece of hardware or as a combination of software and hardware.

The software program 101 is a predetermined communication program of an application program which is, for example, executed by the CPU 11 to reproduce AV data. The software program 101 supplies a socket production request or a jumbo packet use request to the initialization processing section 102, for example, when an instruction to reproduce predetermined AV data is issued through a user interface by a user.

The socket production request is a request for producing a socket to be used for communication with a different apparatus through the network 2. For example, the socket production request is used to request production of a socket for communication with a personal computer (or, for example, a server for exclusive use) which provides AV data. Meanwhile, the jumbo packet function use request is used to allow use of a function (hereinafter referred to also as jumbo packet function) of dynamically setting up a jumbo packet, for example, for each predetermined number of packets.

In particular, the software program 101 supplies the jumbo packet function use request together with the socket production request to the initialization processing section 102 so that the initialization processing section 102 uses the jumbo packet function to receive, for example, AV data.

The initialization processing section 102 performs an initialization process of the jumbo packet function when the jumbo packet function use request is received together with the socket production request from the software program 101.

The initialization process of the jumbo packet function is a process of initializing data stored in the jumbo packet register 103 such as, for example, data of the setup packet number, the timeout time or the timeout time number and so forth.

It is to be noted that the setup packet number (which is hereinafter represented by N which is a natural number) is a value (threshold value) which designates the number of received packets to be set up. For example, where the size of the jumbo packet is 32 kilobytes and the size of the packets is 1,518 bytes as in the example described hereinabove, the setup packet number is set to 20. Consequently, when 20 packets are received, the 20 packets are set up to produce a jumbo packet of the size of 1,518×20 bytes. Similarly, for example, where the size of the jumbo packet is 9 kilobytes and the size of the packets is 1.5 kilobytes, the setup packet number is set to 6. Consequently, when six packets are received, the six packets are set up to produce a jumbo packet of the size of 1.5×6 kilobytes.

Meanwhile, the timeout time is a period of time before a timeout process is executed when no packet is received even if a certain period of time such as, for example, 50 milliseconds elapses after the last packet is received. Furthermore, the timeout time number is a value (threshold value) for designating a number of times such as, for example, three times by which a timeout may occur successively. It is to be noted that the setup packet number, timeout time and timeout time number are hereinafter referred to collectively as jumbo packet setting information.

The initialization processing section 102 includes an initial value setting section 111.

The initial value setting section 111 performs a process of initializing the jumbo packet function to set jumbo packet setting information to the jumbo packet register 103 when the jumbo packet function use request is supplied thereto together with the socket production of 1,518×20 bytes. Similarly, for example, where the size of the jumbo packet is 9 kilobytes and the size of the packets is 1.5 kilobytes, the setup packet number is set to 6. Consequently, when six packets are received, the six packets are set up to produce a jumbo packet of the size of 1.5×6 kilobytes.

Meanwhile, the timeout time is a period of time before a timeout process is executed when no packet is received even if a certain period of time such as, for example, 50 milliseconds elapses after the last packet is received. Furthermore, the timeout time number is a value (threshold value) for designating a number of times such as, for example, three times by which a timeout may occur successively. It is to be noted that the setup packet number, timeout time and timeout time number are hereinafter referred to collectively as jumbo packet setting information.

The initialization processing section 102 includes an initial value setting section 111.

The initial value setting section 111 performs a process of initializing the jumbo packet function to set jumbo packet setting information to the jumbo packet register 103 when the jumbo packet function use request is supplied thereto together with the socket production request from the software program 101. When the initial value setting section 111 performs the jumbo packet function initialization process, it supplies the jumbo packet register number to the socket processing section 104.

It is to be noted that, although details are hereinafter described, jumbo packet setting information is stored in the jumbo packet register 103 for each of different sessions in order to allow distinction thereof and the jumbo packet register number is used to designate the jumbo packet setting information of an object session. The jumbo packet register number may assume, for example, such numbers as 1, 2, 3, . . . , M.

The jumbo packet register 103 is composed of registers. For example, the jumbo packet register 103 stores the jumbo packet setting information or information (hereinafter referred to as use situation) representative of a use state of the jumbo packet function for each of the sessions in accordance with an instruction from the initialization processing section 102 or the socket processing section 104. It is to be noted that the use situation is information indicative of one of a "used state" representing that the jumbo packet function is used and a "free state" representing that the jumbo packet function is not used. Also it is to be noted that the jumbo packet register 103 may be formed identically with the register 32 (FIG. 1).

The socket processing section 104 executes various processes relating to socket communication. For example, the socket processing section 104 executes various processes relating to socket communication under the control of the jumbo packet processing section 33 (data processing section 14).

Further, the socket processing section 104 reads out, based on the jumbo packet register number supplied thereto from the initialization processing section 102, the jumbo packet setting information stored in the region of the jumbo packet register 103 corresponding to the jumbo packet register number and sets the read out jumbo packet setting information. The socket processing section 104 performs a jumbo packet reception process based on the thus set jumbo packet setting information and passes the process for the jumbo packet produced from the received packets to the software program 101.

Here, the jumbo packet reception process is a process of receiving packets while the setup packet number is dynamically varied, for example, in response to the timeout time and the timeout time number.

When the jumbo packet reception process comes to an end, the socket processing section 104 supplies a notification (hereinafter referred to as process end notification) that the jumbo packet reception process ends to the jumbo packet register 103 so as to be stored. Since the jumbo packet reception process ends, the socket processing section 104 changes, for example, the use situation from the "used state" to the "free state" based on the process end notification supplied thereto from the socket processing section 104 and stores the changed use situation. In this manner, since the use situation changes to the "free state", the region which has been placed into the "free state" can be used for a different session.

The socket processing section 104 includes a setup packet number decision section 121, a timeout time decision section 122, a timeout time number decision section 123, a makeup packet number setting section 124, and a packet processing section 125.

The setup packet number decision section 121 decides whether or not the number of received packets is N (setup packet number). The setup packet number decision section 121 supplies a result of the decision to the timeout time decision section 122 or the packet processing section 125.

The timeout time decision section 122 decides based on the decision result supplied thereto from the setup packet number decision section 121 whether or not the timeout time elapses after the last packet is received. The timeout time decision section 122 supplies a result of the decision to the timeout time number decision section 123.

The timeout time number decision section 123 decides based on the decision result supplied thereto from the timeout time decision section 122 whether or not the timeout occurs successively by more than the timeout time number. The timeout time number decision section 123 supplies a result of the decision to the makeup packet number setting section 124 or the packet processing section 125.

The makeup packet number setting section 124 performs, based on the decision result supplied thereto from the timeout time number decision section 123, arithmetic operation of subtracting the set number N (setup packet number) and stores and sets the subtracted number N (setup packet number) into and to the jumbo packet register 103. It is to be noted that, at this time, the makeup packet number setting section 124 may store the number N (setup packet number) not into the jumbo packet register 103 but into, for example, a memory not shown or the like.

The packet processing section 125 produces a jumbo packet from a number of packets equal to the predetermined setup packet number based on the decision result supplied thereto from the setup packet number decision section 121 or the timeout time number decision section 123. The packet processing section 125 passes the processing for the produced jumbo packet to the software program 101. At this time, the software program 101 (that is, the CPU 11) performs the process at step S81 described hereinabove with reference to FIG. 6 because the processing for the jumbo packet is passed thereto from the packet processing section 125.

Now, operation of the personal computer 1 having the functional configuration described hereinabove with reference to FIG. 7 is described with reference to FIGS. 8 to 12. First, a data reception process is described with reference to a flow chart of FIG. 8. This process is started, for example, when an instruction to reproduce predetermined AV data is issued from the user through the user interface.

At step S101, the initialization processing section 102 performs a jumbo packet function initialization process based on a socket production request or a jumbo packet function use request supplied from the software program 101. For example, at step S101, the initialization processing section 102 performs a process of initializing the jumbo packet setting information.

Here, details of the jumbo packet function initialization process by the initialization processing section 102 at step S101 are described with reference to a flow chart of FIG. 9.

At step S111, the initial value setting section 111 decides whether or not a socket production request is inputted from the software program 101.

If it is decided at step S111 that a socket production request is not inputted, then since, for example, an instruction to reproduce predetermined AV data is not issued from the software program 101, the processing returns to step S111 so that the process at step S111 described above is repeated. In other words, the initialization processing section 102 waits, for example, until an instruction to reproduce predetermined AV data is issued from the user through the user interface.

On the other hand, if it is decided at step S111 that a socket production request is inputted from the software program 101, then the processing advances to step S112. At step S112, the initial value setting section 111 decides whether or not a jumbo packet function use request is inputted.

If it is decided at step S112 that a jumbo packet function use request is not inputted, then since a jumbo packet reception process is not performed although, for example, an instruction to reproduce predetermined AV data is issued, the processing returns to step S111 so that the processes described above are repeated. In particular, the initialization processing section 102 waits until an instruction to reproduce predetermined AV data is issued again, for example, through a user interface by a user.

On the other hand, if it is decided at step S112 that a jumbo packet function use request is inputted, then the processing advances to step S113, at which the initial value setting section 111 decides whether or not the jumbo packet function includes a free region. In particular, at step S113, the initial value setting section 111 decides, for example, whether or not there exists a region with regard to which the use state corresponding to the jumbo packet setting information stored in the jumbo packet register 103 indicates the "free state".

Figures 10, 11:
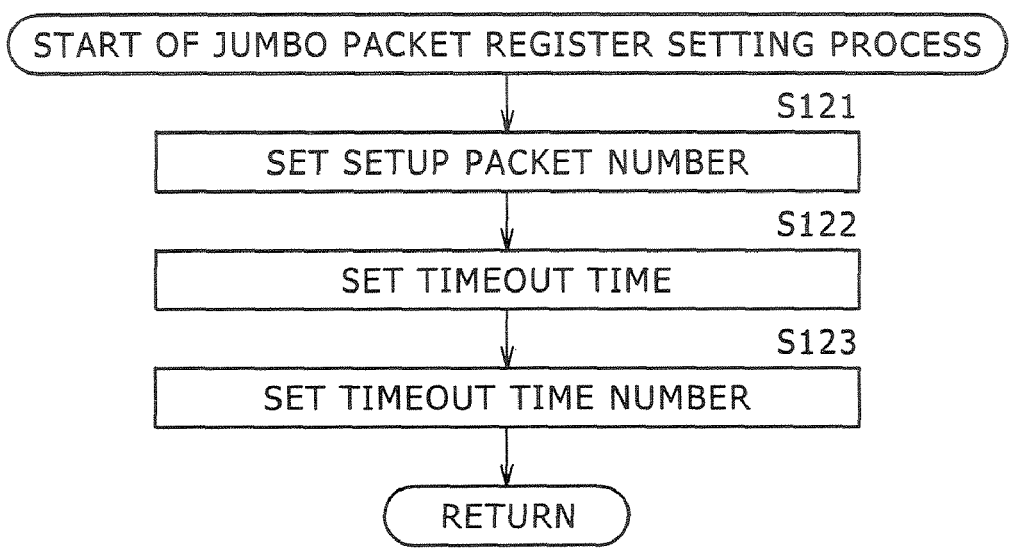
FIG. 10 is a view illustrating a jumbo packet register shown in FIG. 7.
FIG. 11 is a flow chart illustrating a jumbo packet register setting process illustrated in FIG. 9.

The jumbo packet register 103 stores, for example, as seen in FIG. 10, the use situation, setup packet number, timeout time and timeout time number corresponding to each of the jumbo packet register numbers from 1 to M. Since such jumbo packet register numbers are allocated to the individual sessions, the setup packet number, timeout time and timeout time number are allocated for each session.

In particular, as described hereinabove, the "used state" and the "free state" are available as the use situation, and where the use situation represents the "used state", the region is used already by another session. Therefore, the initial value setting section 111 decides whether or not there exists a region whose use situation represents the "free state".

Referring back to FIG. 9, if it is decided at step S113 that the jumbo packet function does not include a free region, then since the jumbo packet function cannot be used, the processing returns to step S111 so that the processes described above are repeated. In other words, the initialization processing section 102 waits, for example, until an instruction to reproduce predetermined AV data is issued from the user through the user interface.

On the other hand, if it is decided at step S113 that the jumbo packet function includes a free region, then the processing advances to step S114, at which the initial value setting section 111 performs a jumbo packet register setting process. For example, if the use situation corresponding to the jumbo potent register number 1 of the jumbo packet register 103 of FIG. 10 represents the "free state", then the initial value setting section 111 performs, at step S114, a jumbo packet register setting process of setting the setup packet number, timeout time and timeout time number corresponding to the jumbo packet register number 1.

Here, details of the jumbo packet register setting process by the initial value setting section 111 at step S114 are described with reference to a flow chart of FIG. 11.

At step S121, the initial value setting section 111 sets the setup packet number. For example, the initial value setting section 111 stores, at step S121, the value 20 into the setup packet number (N) corresponding to the jumbo packet register number 1 of the jumbo packet register 103 of FIG. 10 to set the setup packet number.

At step S122, the initial value setting section 111 sets the timeout time. For example, the initial value setting section 111 stores, at step S122, the value 50 (seconds) into the timeout time corresponding to the jumbo packet register number 1 of the jumbo packet register 103 of FIG. 10 to set the timeout time.

At step S123, the initial value setting section 111 sets the timeout time number. For example, the initial value setting section 111 stores, at step S123, the value 3 (times) into the timeout time number corresponding to the jumbo packet register number 1 of the jumbo packet register 103 of FIG. 10 to set the timeout time number.

Figure 9:
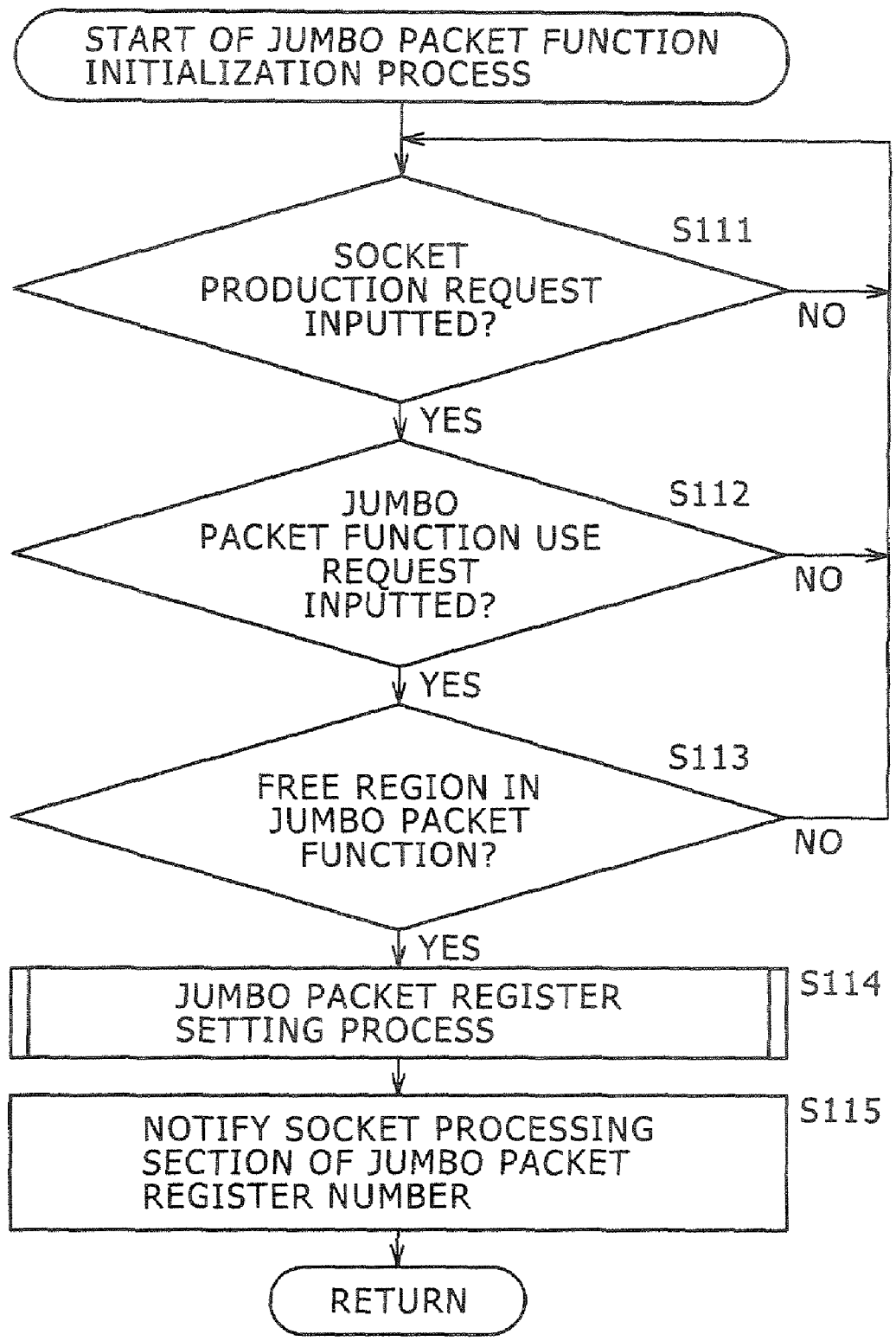
FIG. 9 is a flow chart illustrating details of a jumbo packet function initialization process illustrated in FIG. 8.

Referring back to the flow chart of FIG. 9, at step S115, the initial value setting section 111 notifies the socket processing section 104 of the jumbo packet register number and ends the jumbo packet function initialization process. Then, the process returns to step S101 of FIG. 8 so that the process at step S102 is executed subsequently. For example, the initial value setting section 111 notifies the socket processing section 104 of the jumbo packet register number which currently is 1.

At step S102, the socket processing section 104 performs a jumbo packet reception process.

Details of the jumbo packet reception process by the socket processing section 104 at step S102 are described with reference to FIG. 12.

At step S131, the socket processing section 104 reads out the setup packet number, timeout time and timeout time number, that is, the jumbo packet setting information, from the jumbo packet register 103 based on the jumbo packet register number supplied thereto from the initial value setting section 111. For example, at step S131, the socket processing section 104 reads out the setup packet number which is 20, timeout time which is 50 (milliseconds) and timeout time number which is 3 (times) based on the jumbo packet register number of 1 supplied from the initial value setting section 111 as seen in FIG. 10.

Figure 12:
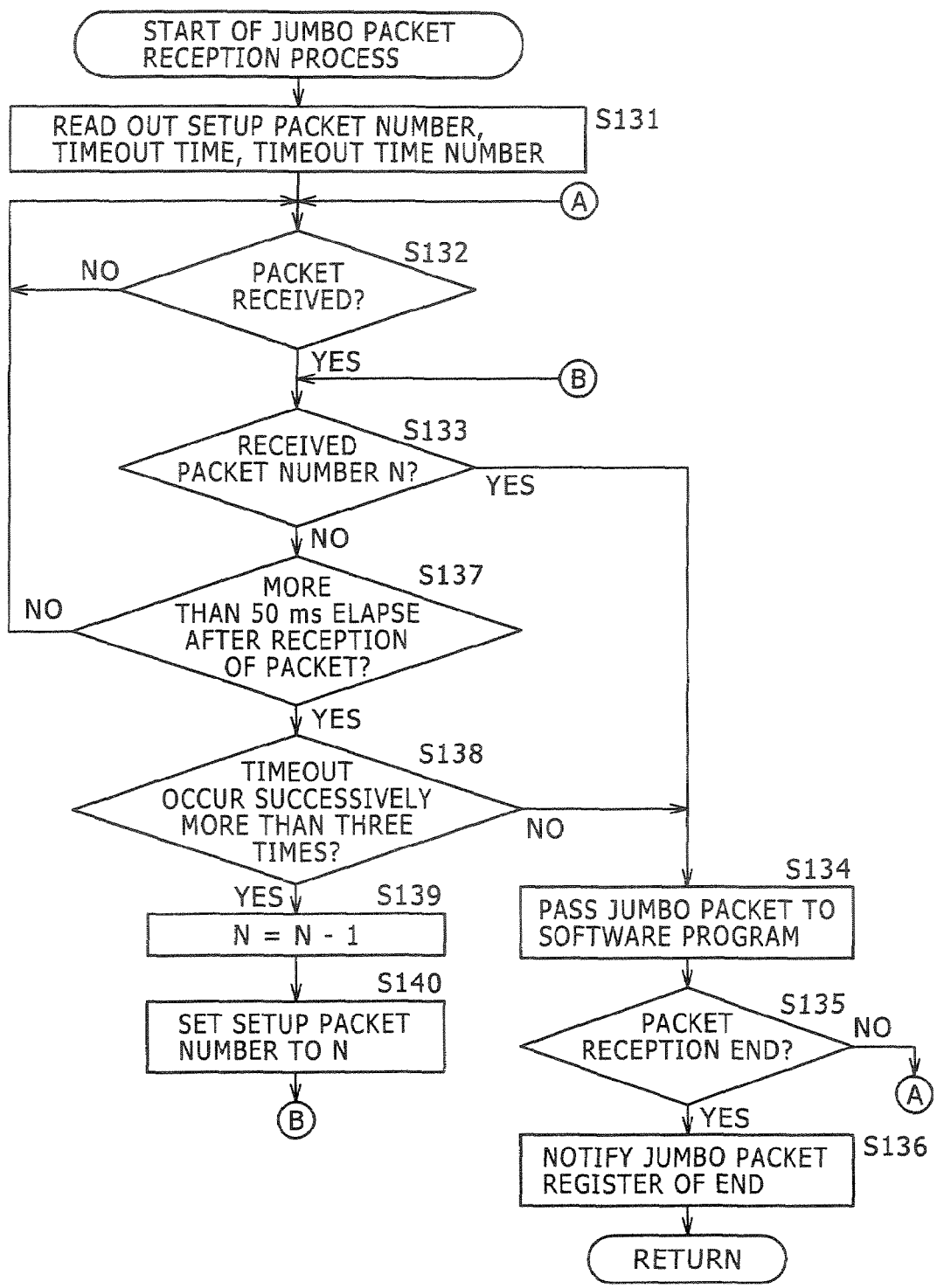
FIG. 12 is a flow chart illustrating a jumbo packet reception process illustrated in FIG. 8.

Referring back to the flow chart of FIG. 12, at step S132, the socket processing section 104 decides whether or not a packet is received.

If it is decided at step S132 that no packet is received, then the processing returns to step S132 so that the process described above is repeated. In other words, the socket processing section 104 waits until it receives a packet.

On the other hand, if it is decided at step S132 that a packet is received, then the processing advances to step S133, at which the setup packet number decision section 121 decides that the number of received packets (packet number) is N (setup packet number). For example, at step S133, the setup packet number decision section 121 decides whether or not the number of received packets is 20.

If it is decided at step S133 that the number of received packets is N (for example, 20), then since a number of packets equal to the setup packet number are received successfully, the processing advances to step S134. At step S134, the packet processing section 125 produces a jumbo packet from a number of packets equal to the predetermined setup packet number. The packet processing section 125 passes the processing for the produced jumbo packet to the software program 101.

At this time, since the processing for the jumbo packet is passed from the packet processing section 125, the software program 101 (that is, the CPU 11) performs, for example, the process at step S81 described hereinabove with reference to FIG. 6. Then, the software program 101 (that is, the CPU 11) performs a TCP/IP process for the received jumbo packet and stores the resulting AV data into the AV data buffer 15. Thereafter, the software program 101 outputs the AV data, for example, to an image sound processing apparatus (not shown) which performs various processes for AV data.

At step S135, the socket processing section 104 decides whether or not reception of packets ends.

If it is decided at step S135 that reception of packets ends, then the processing advances to step S136, at which the socket processing section 104 outputs a process end notification representing that reception of packets ends to the jumbo packet register 103. Thereafter, the processing is returned to step S102 of FIG. 8, and then the data reception process by the personal computer 1 is ended.

At this time, for example, the jumbo packet register 103 changes the use situation corresponding to the jumbo packet register number 1 of the jumbo packet register 103 of FIG. 10 from the "used state" to the "free state" based on the process end notification supplied thereto from the socket processing section 104 and stores the changed use situation. As a result, it becomes possible for the region corresponding to the jumbo packet register number 1 to be used by another session.

On the other hand, if it is decided at step S135 that reception of packets does not end, then since reception of packets is not completed, the processing returns to step S132 so that the processes described above are repeated.

If it is decided at step S133 that the number of received packets is not N (for example, 20), then the processing advances to step S137. At step S137, the timeout time decision section 122 decides whether or not 50 milliseconds (predetermined time period) or more elapse after the last packet is received.

If it is decided at step S137 that 50 milliseconds (predetermined time period) or more do not elapse after the last packet is received, then the processing returns to step S132 so that the processes described above are repeated.

On the other hand, if it is decided at step S137 that 50 milliseconds (predetermined time period) or more elapse after the last packet is received, then the processing advances to step S138. At step S138, the timeout time number decision section 123 decides whether or not a timeout occurs successively by more than three times (predetermined time number).

If it is decided at step S138 that a timeout does not occur successively by more than three times, then since the number of times by which a timeout occurs is within the allowable range, the processing advances to step S134 so that the processes described above are repeated.

On the other hand, if it is decided at step S138 that a timeout occurs successively by more than three times, then since the number of times by which a timeout occurs exceeds the allowable range, the processing now advances to step S139. At step S139, the makeup packet number setting section 124 decrements the value N (setup packet number) by 1. For example, at step S139, the makeup packet number setting section 124 decrements the value N (setup packet number) which currently is one to calculate the value N as 19.

At step S140, the makeup packet number setting section 124 sets the resulting setup packet number. Thereafter, the processing returns to step S133 so that the processes described above are repeated. For example, at step S140, the makeup packet number setting section 124 stores the value N (setup packet number) which currently is 19 into the jumbo packet register 103 to set the value N (setup packet number).

Then, at step S133, the setup packet number decision section 121 now decides whether or not the number of received packets is 19. When a timeout occurs successively by more than a predetermined number of times, since the value N (setup packet number) can be dynamically decremented (for example, decremented from 20 to 19) in this manner, a timeout becomes less likely to occur. As a result, deterioration of the transfer rate which arises from the timeout process can be suppressed.

As described above, with the embodiment of the present invention, reception of packets can be performed at a higher rate.

Further, with the embodiment of the present invention, when a packet is not received for more than a fixed period of time, even if the setup packet number is not satisfied, a timeout process of passing the processing to the CPU with a size at the point of time, and if the timeout process is executed successively, then the setup package number can be varied dynamically. As a result, deterioration of the transfer rate which arises from the timeout process can be suppressed. Furthermore, for example, even when a number of packets greater than the setup packet number are not transmitted, deterioration of the transfer rate which arises from the timeout process can be suppressed by dynamically varying the setup packet number.

Furthermore, with the embodiment of the present invention, a transfer delay or the like which arises from the fact that, for example, the size of the buffer of the transmission side or the setup packet number of the reception side is not optimum can be eliminated by dynamically varying the setup packet number. Consequently, high rate transfer can always be achieved.

It is to be noted that, while the embodiment of the present invention is described taking the personal computer 1 as an example, the present invention is not limited to this but can be applied to any apparatus which is connected to a network and communicates with a different apparatus connected to the network such as, for example, a video camera, an AV server or a switcher.

Further, while, in the embodiment described hereinabove, the protocol stack is described taking the TCP/IP as an example, according to the present invention, the protocol stack is not limited to this, and for example, the UDP/IP (User Datagram Protocol/Internet Protocol) or the like may be used instead.

Furthermore, while, in the embodiment described above, the setup packet number is decremented when a timeout occurs by a predetermined number of times, naturally the setup packet number may be increased dynamically in response to a timeout situation. Further, while, in the embodiment described above, the setup packet number is set on the reception side, it may otherwise be set on the transmission side.

FIG. 13 shows an example of a configuration of a personal computer which executes the series of processes described above in accordance with a program. Referring to FIG. 13, a CPU 211 executes various processes in accordance with the program recorded in a ROM 212 or a recording section 218. Programs to be executed by the CPU 211, data and so forth are suitably stored into a RAM 213. The CPU 211, ROM 212 and RAM 213 are connected to one another by a bus 214.

Also an input/output interface 215 is connected to the CPU 211 through the bus 214. An inputting section 216 including a switch, a microphone and so forth and an outputting section 217 including a display unit, a speaker and so forth are connected to the input/output interface 215. The CPU 211 executes various processes in accordance with an instruction inputted from the inputting section 216. Then, the CPU 211 outputs a result of the processes to the outputting section 217.

A recording section 218 formed from a hard disk or the like is connected to the input/output interface 215 and stores a program to be executed by the CPU 211 and various data. A communication section 219 communicates with an external apparatus through a network such as the Internet and/or a local area network. A program may be acquired through the communication section 219 and recorded into the recording section 218.

A drive 220 is connected to the input/output interface 215. When a removable medium 221 such as a magnetic disk, an optical disk, a magneto-optical disk, a semiconductor memory or the like is suitably loaded into the drive 220, the drive 220 drives the removable medium 221. Thereupon, the drive 220 acquires a program, data and so forth recorded on the removable medium 221. The acquired program or data are transferred to and stored into the recording section 218 as occasion demands.

The program recording medium on which a program to be installed into a computer and placed into an executable condition by the computer is recorded may be, for example, as shown in FIG. 13, a removable medium 221 in the form of a package medium formed from a magnetic disk (including a flexible disk), an optical disk (including a CD-ROM (Compact Disk-Read Only Memory) and a DVD (Digital Versatile Disk)), a magneto-optical disk, or a semiconductor memory. Else, the program recording medium may be formed as the ROM 212, a hard disk included in the recording section 218 or the like in which the program is stored temporarily or permanently. Storage of the program into the program recording medium is performed, as occasion demands, through the communication section 219 which is an interface such as a router and a modem, making use of a wired or wireless communication medium such as a local area network, the Internet or a digital satellite broadcast.

It is to be noted that, in the present specification, the steps which describe the program stored in a recording medium may be but need not necessarily be processed in a time series in the order as described, and include processes which are executed in parallel or individually without being processed in a time series.

While a preferred embodiment of the present invention has been described using specific terms, such description is for illustrative purpose only, and it is to be understood that changes and variations may be set without departing from the spirit or scope of the following claims.

What is claimed is:

1. A reception apparatus for receiving first packets, the reception apparatus comprising:
   a communication section to receive the first packets through a network responsive to an application layer request; and
   a processing unit configured to determine whether a number of the first packets received through the network exceeds a first threshold value which is a number of the first packets used when a second packet having a size of data greater than a size of data placed in each of the first packets is produced from the first packets,
   said processing unit further configured to determine, in response to said processing unit determining that the first threshold value is not exceeded by the number of the first packets received through the network, whether a predetermined period of time has elapsed after a last one of the first packets received through the network was received,
   said processing unit further configured to determine, in response to said processing unit determining that the predetermined period of time has elapsed after the last one of the first packets received through the network was received, whether a number of times, by which the predetermined period of time has successively elapsed after the last one of the first packets received through the network was received, exceeds a second threshold value,
   said processing unit further configured to set, in response to said processing unit determining that the second threshold value is exceeded by the number of times that the predetermined period of time has successively elapsed after the last one of the first packets received through the network was received, the first threshold value to decrement the number of the first packets to be used to produce the second packet.

2. The reception apparatus according to claim 1, wherein the processing unit is further configured to produce, when said processing unit determines that the second threshold value is not exceeded by the number of times that the predetermined period of time has successively elapsed, the second packet from the first packets and pass a processing to said application layer.

3. The reception apparatus according to claim 1, wherein, when said processing unit determines that the second threshold value is exceeded by the number of times that the predetermined period of time has successively elapsed, said processing unit sets the first threshold value to decrement the number of the first packets to be used to produce the second packet by one.

4. The reception apparatus according to claim 1, wherein said processing unit is configured to set initial values for the first threshold value, the second threshold value and the predetermined period of time.

5. A reception method for a packet reception apparatus for receiving first packets, the reception method comprising:
   receiving the first packets through a network in response to a request from an application layer;
   deciding whether a number of the first packets received through the network exceeds a first threshold value which is a number of the first packets used when a second packet having a size of data greater than a size of data placed in each of the first packets is produced from the first packets;
   deciding, in response to a decision that the first threshold value is not exceeded by the number of first packets received through the network, whether a predetermined period of time has elapsed after a last one of the first packets was received through the network;

deciding, in response to a decision that the predetermined period of time has elapsed after the last one of the first packets was received through the network, whether a number of times, by which the predetermined period of time has successively elapsed after the last one of the first packets received through the network was received, exceeds a second threshold value; and setting, with the packet reception apparatus, upon a decision that the second threshold value is exceeded by the number of times that the predetermined period of time has successively elapsed after the last one of the first packets received through the network was received, the first threshold value to decrement the number of the first packets to be used to produce the second packet.

6. A computer-readable, non-transitory medium encoded with a program, which, when executed by a computer, causes the computer to perform a processing for receiving first packets, the processing comprising:

receiving the first packets through a network in response to a request from an application layer;

deciding whether a number of the first packets received through the network exceeds a first threshold value which is a number of the first packets used when a second packet having a size of data greater than a size of data placed in each of the first packets is produced from the first packets;

deciding, in response to a decision that the first threshold value is not exceeded by the number of first packets received through the network, whether a predetermined period of time has elapsed after a last one of the first packets was received through the network;

deciding, in the response to a decision that the predetermined period of time has elapsed after the last one of the first packets was received through the network, whether a number of times, by which the predetermined period of time has successively elapsed after the last one of the first packets received through the network was received, exceeds a second threshold value; and setting, upon a decision that the second threshold value is exceeded by the number of times that the predetermined period of time has successively elapsed after the last one of the first packets received through the network was received, the first threshold value to decrement the number of the first packets to be used to produce the second packet.

* * * * *